US 10,967,854 B2

(12) United States Patent
Kataoka

(10) Patent No.: US 10,967,854 B2
(45) Date of Patent: Apr. 6, 2021

(54) LANE KEEPING SYSTEM RESPONSIVE TO STEERING INPUT

(71) Applicant: TOYOTA JIDOSHA KABUSHIKI KAISHA, Toyota (JP)

(72) Inventor: Hiroaki Kataoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 427 days.

(21) Appl. No.: 15/832,324

(22) Filed: Dec. 5, 2017

(65) Prior Publication Data

US 2018/0170371 A1    Jun. 21, 2018

(30) Foreign Application Priority Data

Dec. 21, 2016  (JP) .............................. JP2016-247813

(51) Int. Cl.
*B60W 30/09*   (2012.01)
*B60W 30/12*   (2020.01)
*B60W 40/04*   (2006.01)
*B60W 10/20*   (2006.01)
*B60W 50/08*   (2020.01)

(52) U.S. Cl.
CPC ............ *B60W 30/09* (2013.01); *B60W 10/20* (2013.01); *B60W 30/12* (2013.01); *B60W 40/04* (2013.01); *B60W 50/08* (2013.01); *B60W 2554/00* (2020.02)

(58) Field of Classification Search
CPC ...... B60W 30/09; B60W 50/08; B60W 10/20; B60W 40/04; B60W 30/12; B60W 2554/00; B60W 2540/18; B60W 30/025
See application file for complete search history.

(56) References Cited

U.S. PATENT DOCUMENTS

2005/0107931 A1* 5/2005 Shimakage ............ G08G 1/167
701/41
2010/0295668 A1   11/2010 Kataoka
(Continued)

FOREIGN PATENT DOCUMENTS

JP    2005-343305 A    12/2005
JP    2006-331304 A    12/2006
(Continued)

*Primary Examiner* — Rami Khatib
(74) *Attorney, Agent, or Firm* — Oliff PLC

(57) ABSTRACT

A driving supporter includes: an object-information obtainer that obtains object information relating to at least an object in an area; an environment obtainer that obtains a relative positional relationship between the own vehicle and the object located in the area and identified based on the object information obtained by the object-information obtainer; and a support inhibitor that inhibits driving support when an absolute value of a steering operation value representing a magnitude of a steering operation is greater than an inhibition threshold value. The support inhibitor includes a threshold-value determiner that determines the inhibition threshold value to a smaller value when the relative positional relationship is a specific relationship in which it is estimated that a steering operation in a direction in which the own vehicle avoids the object is to be performed, than when the relative positional relationship is not the specific relationship.

8 Claims, 12 Drawing Sheets

(56) References Cited

U.S. PATENT DOCUMENTS

| | | | |
|---|---|---|---|
| 2013/0190985 A1* | 7/2013 | Nakano | B62D 15/025 |
| | | | 701/41 |
| 2016/0129938 A1 | 5/2016 | Okuda | |
| 2017/0217433 A1* | 8/2017 | Halder | G05D 1/0274 |
| 2018/0037260 A1* | 2/2018 | Otake | B62D 15/025 |

FOREIGN PATENT DOCUMENTS

| | | |
|---|---|---|
| JP | 2009-208505 A | 9/2009 |
| JP | 2010-271999 A | 12/2010 |
| JP | 2015-020666 A | 2/2015 |

\* cited by examiner

FIG.7
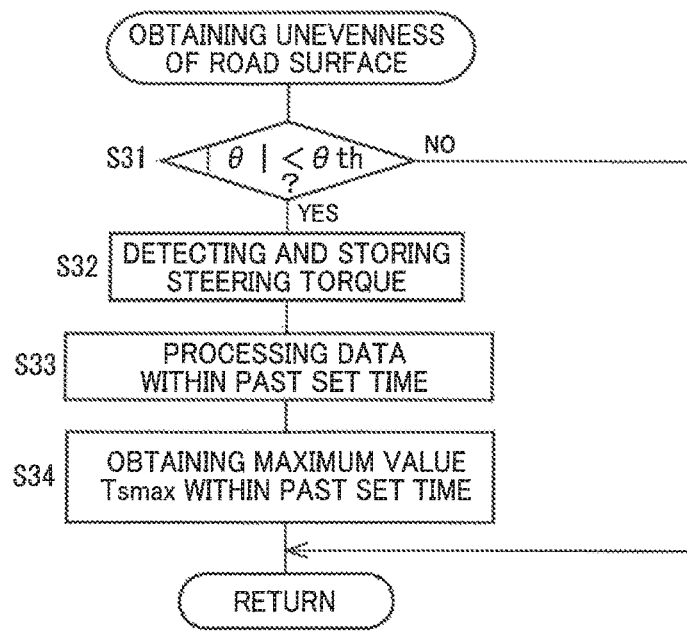
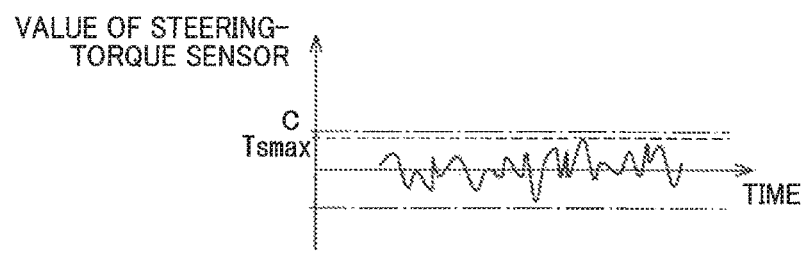
FIG.8A VALUE OF STEERING-TORQUE SENSOR
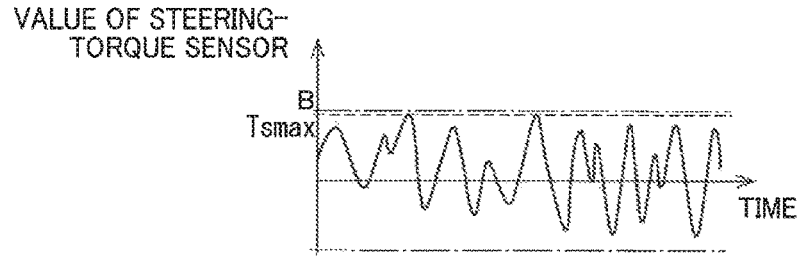
FIG.8B VALUE OF STEERING-TORQUE SENSOR
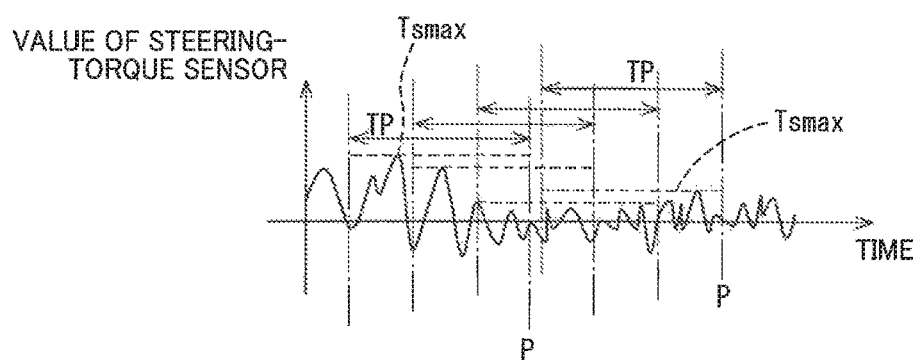
FIG.8C VALUE OF STEERING-TORQUE SENSOR

LANE KEEPING SYSTEM RESPONSIVE TO STEERING INPUT

CROSS REFERENCE TO RELATED APPLICATION

The present application claims priority from Japanese Patent Application No. 2016-247813, which was filed on Dec. 21, 2016, the disclosure of which is herein incorporated by reference in its entirety.

BACKGROUND

The following disclosure relates to a driving supporter configured to support driving of a driver.

Patent Document 1 (Japanese Patent Application Publication No. 2010-271999) discloses a driving supporter configured to support driving in order to prevent a departure of a vehicle from a lane. In the driving supporter disclosed in Patent Document 1, an electric steering device is controlled to apply steering torque in the case where there is a possibility of a departure of the vehicle from a lane. This operation prompts a driver to perform steering to prevent the departure of the vehicle from the lane.

SUMMARY

Accordingly, an aspect of the disclosure relates to improvement of a driving supporter, for example, reduction of a not-normal feeling given to a driver.

A driving supporter according to the present aspect is configured to perform driving support such that an own vehicle runs within a lane. In the present driving supporter, the driving support is inhibited when an absolute value of a steering operation value is greater than an inhibition threshold value. However, the inhibition threshold value is determined to a small value when a relative positional relationship between an object and an own vehicle is a relationship in which it is estimated that a steering operation in a direction in which the own vehicle avoids the object is to be performed. Examples of the steering operation in the direction in which the own vehicle avoids the object include: a steering operation in a direction in which the own vehicle is away from the object in the case where the object is located on a front lateral side of the own vehicle; and a steering operation in a direction in which the own vehicle is moved rightward or leftward to avoid the object in the case where the object is located in front of the own vehicle. It is possible to consider that the object located on a front lateral side or a front side of the own vehicle is an object having such a relative positional relationship with the own vehicle that it is estimated that the steering operation in the direction in which the own vehicle avoids the object is to be performed.

For example, in the case where the object is present on a front lateral side or a front side of the own vehicle, and the driver has performed the steering operation in the direction in which the own vehicle avoids the object, when steering torque is applied by the driving support performed such that the own vehicle runs within the lane, a direction of the steering torque is opposite to the direction of the steering operation performed by the driver. Thus, the driver feels a not-normal feeling. In the present driving supporter, in contrast, the inhibition threshold value is reduced in the case where the above-described object is present. That is, the driving support is inhibited even when the absolute value of the steering operation value is small, making it difficult for the driving support to be executed. As a result, it is possible to make it difficult for the driver to feel the not-normal feeling.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 7 is a flow chart representing a procedure of a road-surface-unevenness obtaining program stored in the storage;

FIG. 8A is a view illustrating changes of a steering torque in the own vehicle in the case where unevenness of a road surface is small;

FIG. 8B is a view illustrating changes of the steering torque in the own vehicle in the case where the unevenness of the road surface is large;

FIG. 8C is a view for explaining obtainment of the unevenness of the road surface;

DETAILED DESCRIPTION OF THE EMBODIMENTS

Hereinafter, there will be described embodiments by reference to the drawings.

First Embodiment

Figure 1:
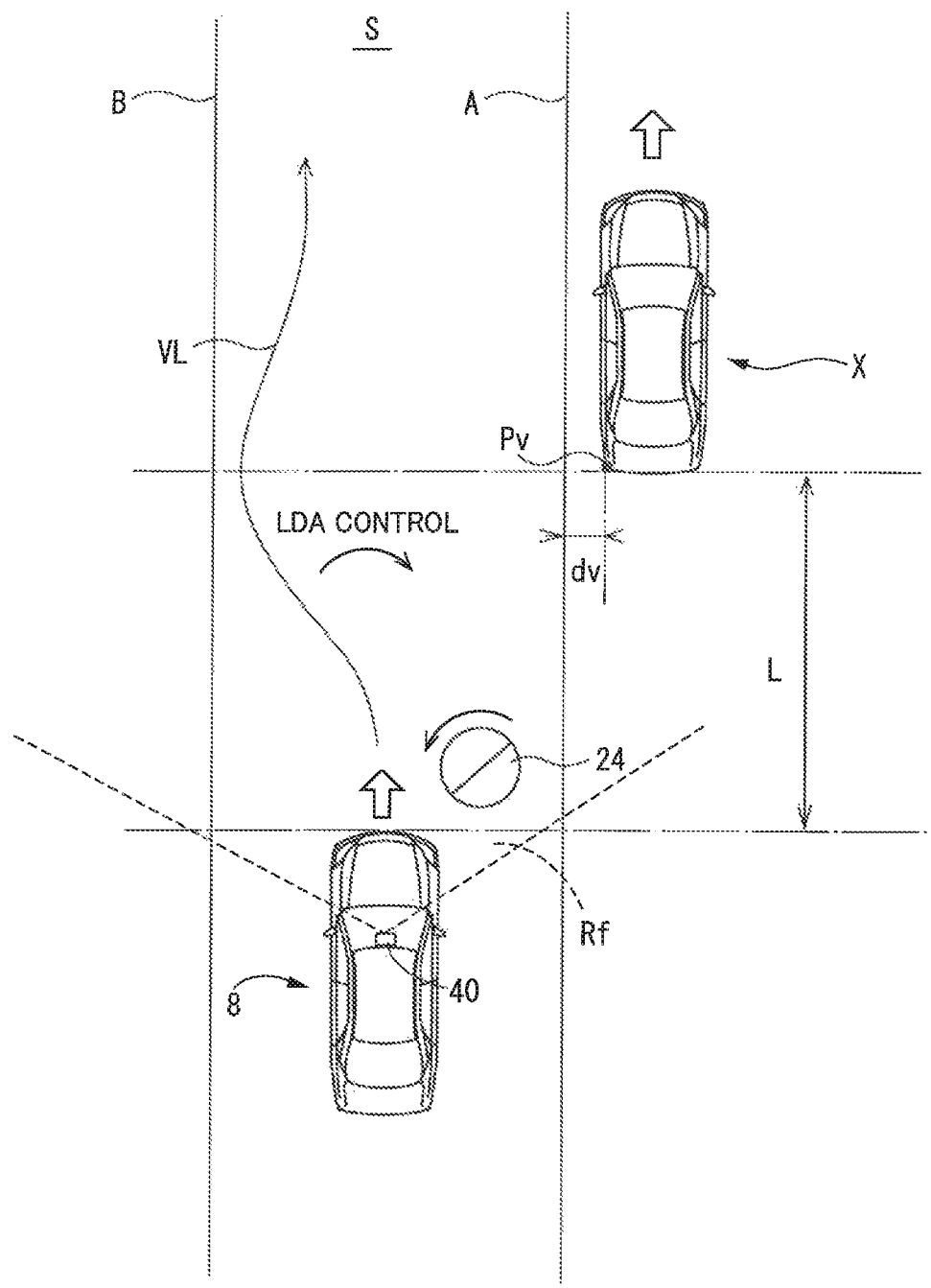
FIG. 1 is a view illustrating a relative positional relationship between an object and an own vehicle including a driving supporter according to a first embodiment.
Figure 2:
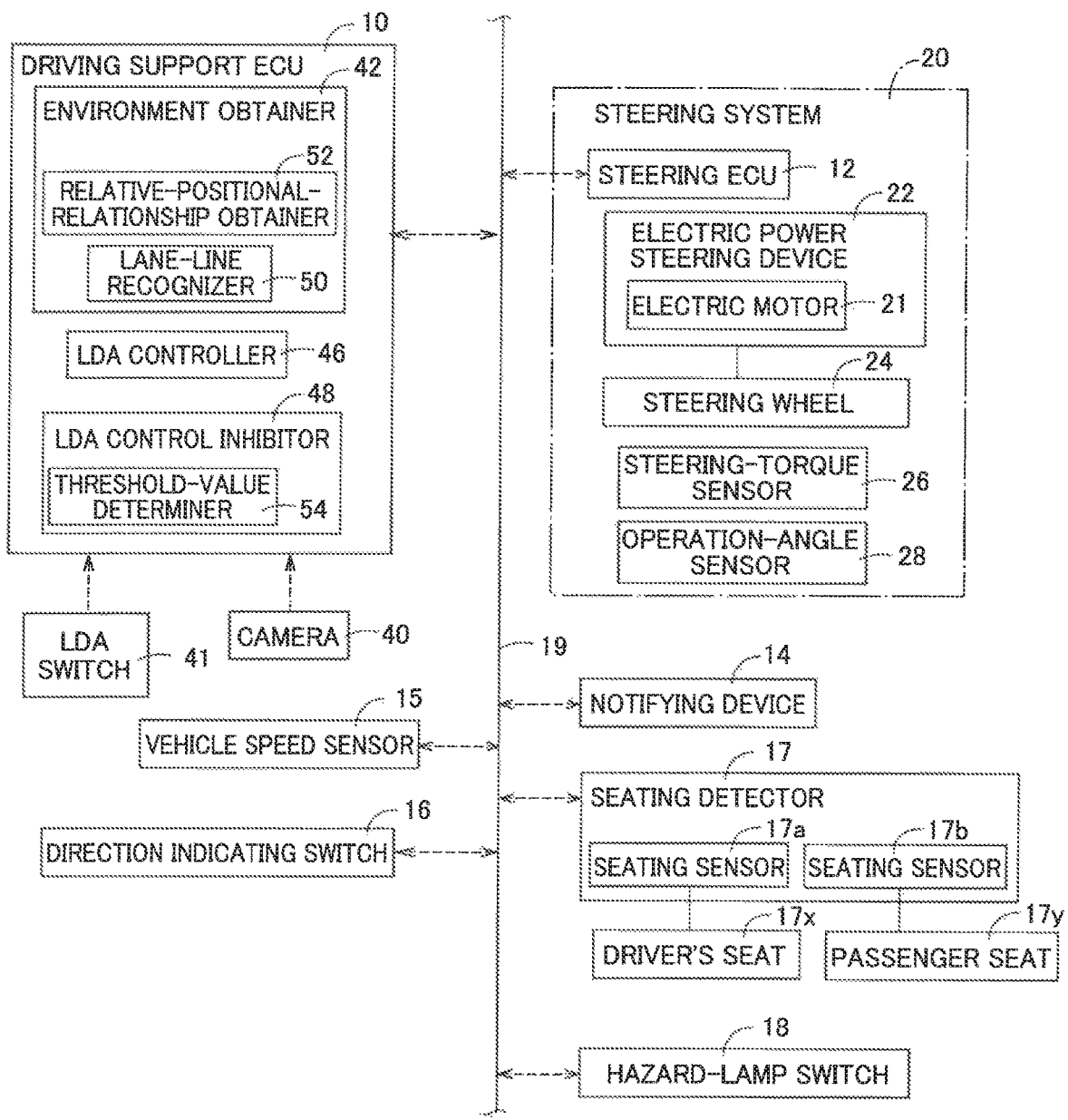
FIG. 2 is a block diagram conceptually illustrating the driving supporter.

A driving supporter according to the present embodiment is installed in an own vehicle 8 illustrated in FIG. 1. As illustrated in FIG. 2, the own vehicle 8 includes a driving-support electric control unit (ECU) 10, a steering ECU 12, a notifier 14, a vehicle speed sensor 15, a direction indicating switch 16, a seating detector 17, and a hazard-lamp switch 18. These devices are communicably connected to each other over a controller area network (CAN) 19. The vehicle speed sensor 15 detects a vehicle speed Vs based on wheel speeds of front left and right and rear left and right wheels of the own vehicle 8. The vehicle speed Vs is a running speed of the own vehicle 8. The direction indicating switch 16 is operable by the driver and indicates a direction of travel of the own vehicle 8 (which corresponds to a direction of a steering operation) when the steering operation is performed.

The seating detector 17 includes one seating sensor 17a and a plurality of seating sensors 17b provided so as to respectively correspond to seats in the own vehicle. The seating sensor 17a is provided for a driver's seat 17x, and the seating sensors 17b are respectively provided on a plurality of passenger seats 17y different from the driver's seat 17x. Each of the seating sensor 17a and the seating sensors 17b detects whether a person or the like is seated a corresponding one of the seats. The hazard-lamp switch 18 is turned on to light up a hazard lamp, not illustrated. For example, the hazard-lamp switch 18 is turned on when the own vehicle 8 is parked by going off the lane.

The steering ECU 12 is an element of a steering system 20 and principally constituted by a computer including an executer, a storage, and an input/output device. The steering system 20 includes: an electric power steering device 22 including an electric motor 21; a steering wheel 24 as a steering operation member; a steering-torque sensor 26; and an operation-angle sensor 28. The electric motor 21, the steering-torque sensor 26, and the operation-angle sensor 28 are connected to the input/output device of the steering ECU 12, for example.

The electric power steering device 22 is configured to turn steered road wheels by using (i) steering torque applied from a driver to a steering mechanism via the steering wheel 24 and (ii) steering torque applied from the electric motor 21 to the steering mechanism. The steering ECU 12 controls the electric motor 21 to control the steering torque applied to the steering mechanism. Examples of application of the steering torque to the steering mechanism include: application of the steering torque to the steering mechanism in the same direction as a direction of the steering operation performed by the driver; application of the steering torque to the steering mechanism in a direction reverse to the direction of the steering operation performed by the driver; and application of the steering torque to the steering mechanism without the steering operation of the driver.

The steering-torque sensor 26 is configured to detect steering torque applied from the driver via the steering wheel 24 to a torsion bar of the steering mechanism. The steering-torque sensor 26 outputs, as a positive value, steering torque applied by a turn of the steering wheel 24 in the right direction and outputs, as a negative value, steering torque applied by a turn of the steering wheel 24 in the left direction. In the present embodiment, when the steering torque in the right direction is applied, a steering-direction flag Fs is set to the right (Fs=2), and when the steering torque in the left direction is applied, the steering-direction flag Fs is set to the left (Fs=1). When no steering torque is applied in the right direction or the left direction, the steering-direction flag Fs is set to "0".

The operation-angle sensor 28 is configured to detect an operated angle of the steering wheel 24 from a reference position. The reference position of the steering wheel 24 is a position of the steering wheel 24 in the case where the own vehicle 8 is driving straight ahead without external disturbance.

The notifier 14 may provide notification visually by using a display, light, or the like and may provide notification auditorily by using a speaker or the like, for example.

The driving support ECU 10 is principally constituted by a computer including an executer, a storage, and an input/output device, not illustrated. A camera 40 configured to take an image, a lane-departure-alert (LDA) switch 41, and so on are connected to the input/output device of the driving support ECU 10. The camera 40 is installed on a back surface of a front glass of the own vehicle 8 and capable of taking an image including an object and lane lines within a region Rf, illustrated in FIG. 1, located on a front side and front lateral sides of the own vehicle 8. The LDA switch 41 is operable by the driver and turned on when the driver permits execution of the LDA control as driving support.

The driving support ECU 10 includes an environment obtainer 42, an LDA controller 46, and an LDA control inhibitor 48.

The environment obtainer 42 is configured to obtain an environment in an area based on the image obtained by the camera 40 and includes a lane-line recognizer 50 and a relative-positional-relationship obtainer 52. The area in which the environment is obtained by the environment obtainer 42 is determined in accordance with an installed position of the camera and the characteristics of the camera, for example. In the present embodiment, since the camera 40 is installed on a front portion of the own vehicle, the region Rf is an area located on a front side and front lateral sides of the own vehicle. The environment is determined by a relative positional relationship between the own vehicle and the object located in the region Rf. It is possible in some cases to consider that a relative positional relationship between the object and one of the lane lines defining the own lane is the relative positional relationship between the object and the own vehicle.

The lane-line recognizer 50 is configured to recognize lane lines in the region Rf based on the image taken by the camera 40. For example, as illustrated in FIG. 1, in the case where the own vehicle 8 is running on an own lane S, the lane-line recognizer 50 identifies lane lines A, B defining the own lane S from opposite sides thereof. The relative-positional-relationship obtainer 52 is configured to identify an object X based on the image taken by the camera 40 and obtain the relative positional relationship between the object X and the own vehicle 8. As a relative positional relationship between the own vehicle 8 and the object X, in the present embodiment, as illustrated in FIG. 1, the relative-positional-relationship obtainer 52 obtains: a vehicle-to-object distance L that is a distance between the own vehicle 8 and the object X in a front and rear direction which may be referred to as "running direction"; an object-side distance dv that is a distance between a predetermined reference point Pv in the object X and the lane line A defining the own lane S which is nearer to the object X than the lane line B, in a lateral direction of the own vehicle 8 which may be referred to as "widthwise direction"; a relative velocity; and a direction directed from the own vehicle 8 to the object X.

The vehicle-to-object distance L is a value obtained assuming that the own vehicle 8 and the object X are on the same lane. As illustrated in FIG. 1, the object-side distance dv takes a positive value when the predetermined reference point Pv in the object X is located outside the own lane S, that is, when the predetermined reference point Pv is located on an opposite side of the lane line A from the own lane S, for example. The object-side distance dv takes a negative value when the predetermined reference point Pv is located in the own lane S, that is, when the predetermined reference point Pv and the own lane S are located on the same side of the lane line A. The distance between the object X and the own vehicle 8 in the lateral direction becomes relatively smaller when the object-side distance dv is small than when the object-side distance dv is large. Thus, it is possible to consider that the object-side distance dv is a physical quantity representing a relative positional relationship between the own vehicle 8 and the object X in the lateral direction. The direction directed from the own vehicle 8 to the object X is a front-right direction in the case illustrated in FIG. 1, for example.

In the present embodiment, in the case where the vehicle-to-object distance L is less than or equal to a set vehicle-to-object distance Lth, and the object-side distance dv is less than or equal to a first set object-side distance dvth1 (a positive value), and an approach velocity SV as the relative velocity is greater than or equal to a set approach velocity SVth, it is determined that the object X and the own vehicle 8 have a predetermined specific relationship, and the object X is set as a specific object OV. In the case where the specific object OV is present, it is estimated that the driver is to perform a steering operation in a direction in which the own vehicle 8 avoids the specific object OV, and it is estimated that the own vehicle 8 is to avoid the specific object OV. In other words, the specific relationship may be a relationship in which it is estimated that the steering operation in the direction in which the own vehicle 8 avoids the specific object OV is to be performed.

When the object-side distance dv is short, the driver more easily feels a high necessity for the own vehicle 8 to avoid the object X, than when the object-side distance dv is long. The first set object-side distance dvth1 may be set to such a distance that it is estimated that the steering operation in the direction in which the own vehicle 8 avoids the object X is to be performed by the driver. It is known that the first set object-side distance dvth1 is about 30 cm in general.

It is possible to consider that the driver has a higher necessity of performing the steering operation in the direction in which the own vehicle 8 avoids the specific object OV, when the vehicle-to-object distance is short, and the approach velocity is high than when the vehicle-to-object distance is long, and the approach velocity is low. Thus, each of the set vehicle-to-object distance Lth and the set approach velocity SVth may be set to such a value that it is considered that there is a high necessity for the driver to perform the steering operation in the direction in which the own vehicle 8 avoids the specific object OV, for example. For example, it is known that the set vehicle-to-object distance Lth and the set approach velocity SVth are about 50 m and about 30 km/h, respectively, in general.

When the object-side distance dv is greater than or equal to a second set object-side distance dvth2 (a negative value), it is determined that the object X is present on a front right side or a front left side of the own vehicle 8. The case where the object-side distance dv is less than or equal to the first set object-side distance dvth1 includes a case where at least a portion of the object X is located in the own lane. However, in the case where more than half of the object X is located in the own lane, for example, it may be difficult to determine whether the object X is located on a front right side of the own vehicle 8 and whether the object X is located on a front left side of the own vehicle 8, and it may be difficult to determine whether the steering operation for avoiding the object X is to be performed in the right direction or the left direction. To overcome this problem, in the present embodiment, when the object-side distance dv is greater than or equal to the second set object-side distance dvth2, it is determined that the object X is present on a front right side or a front left side of the own vehicle 8, and when the object-side distance dv is less than the second set object-side distance dvth2, it is determined that the object X is located in front of the own vehicle 8. It is noted that the second set object-side distance dvth2 may be about −50 cm in general.

In the present embodiment, a reaching estimated time tc is obtained for the specific object OV that is detected first by the environment obtainer 42. The reaching estimated time tc is a length of time in which it is estimated that the own vehicle 8 reaches the specific object OV. The reaching estimated time tc may be calculated based on the relative velocity and the vehicle-to-object distance between the own vehicle 8 and the object X. The specific object OV as the object X detected first may be hereinafter referred to as "appeared object". The specific object OV as the appeared object may appear on a front side of the own vehicle 8 in the own lane S and may appear on a front right side or a front left side of the own vehicle 8, but in either case the reaching estimated time is calculated assuming that the appeared object OV and the own vehicle 8 are located on the same lane.

Figure 6:
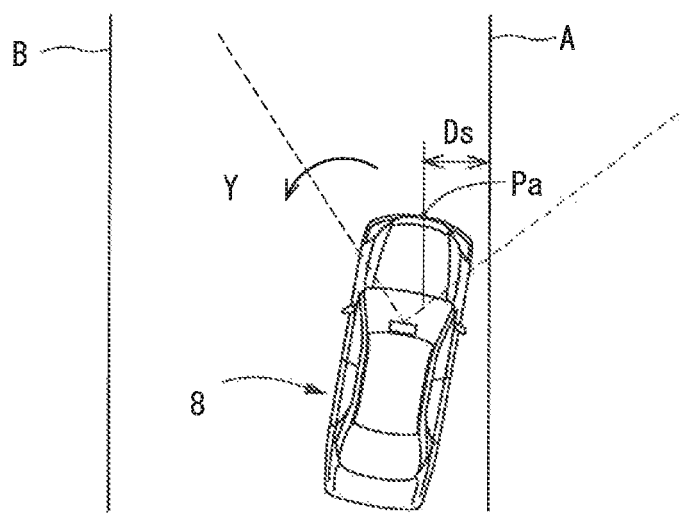
FIG. 6 is a view illustrating an own-vehicle-side distance.

The LDA controller 46 is configured to execute the LDA control for driving support to prevent a departure of the own vehicle 8 from the lane. As illustrated in FIG. 6, when an own-vehicle-side distance Ds that is a shorter one of a distance between a predetermined reference point Pa in the own vehicle 8 and the lane line A defining the own lane S and a distance between the reference point Pa and the lane line B defining the own lane S is less than a start threshold value Dsa in a state in which a cancel flag which will be described below is OFF, and execution of the LDA control is permitted, it is determined that the possibility of the departure of the own vehicle 8 is high, and the LDA control is started. In the LDA control, steering torque Y in a direction in which the own-vehicle-side distance Ds increases is applied. The magnitude of the applied steering torque is larger when the own-vehicle-side distance Ds is small than when the own-vehicle-side distance Ds is large. When the own-vehicle-side distance Ds exceeds an end threshold value Dsb that is larger than the start threshold value Dsa, it is determined that the possibility of the departure of the own vehicle 8 has become low, and the LDA control is terminated. The own-vehicle-side distance Ds is one example of a value representing the possibility of the departure, and it is determined that the possibility of the departure is higher when the own-vehicle-side distance Ds is short than when the own-vehicle-side distance Ds is long.

Figure 5:
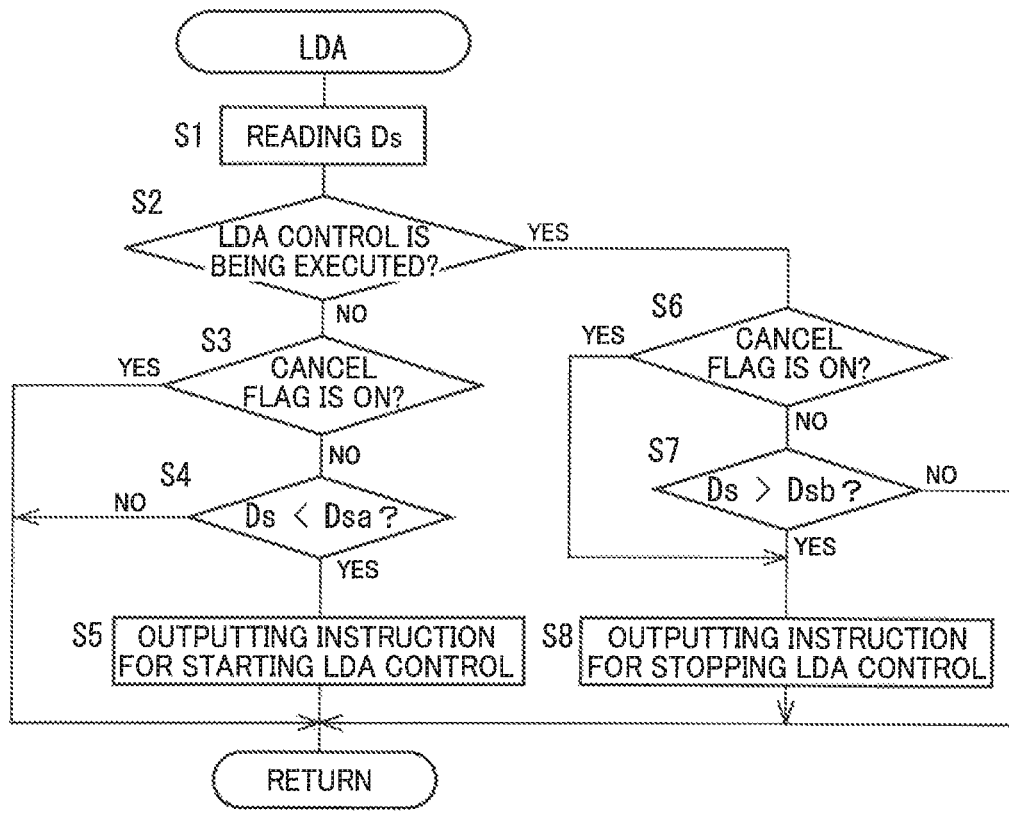
FIG. 5 is a flow chart representing a procedure of a lane-departure-alert (LDA) control program stored in the storage.

The LDA control is executed by executing the LDA control program. FIG. 5 is a flow chart representing a flow of the LDA control program. The LDA control program is executed in a cycle of a predetermined time. This flow begins with S1 at which the own-vehicle-side distance Ds and other values are read. It is determined at S2 whether the LDA control is being executed. When the LDA control is not being executed, it is determined at S3 whether the cancel flag is ON. When the cancel flag is OFF, it is determined at S4 whether the own-vehicle-side distance Ds is less than the start threshold value Dsa. When the own-vehicle-side distance Ds is less than the start threshold value Dsa, and the possibility of the departure is high, the steering ECU 12 at S5 outputs an instruction for starting the LDA control. The steering ECU 12 controls the electric motor 21 to support driving by applying steering torque in a direction in which the own-vehicle-side distance Ds is reduced. When the cancel flag is ON, a positive decision (YES) is made at 53, and the processings at S4 and S5 are not executed. Start of the LDA control is inhibited regardless of the value of the own-vehicle-side distance Ds.

When the LDA control is being executed, a positive decision (YES) is made at S2, and it is determined at S6 whether the cancel flag is ON. When the cancel flag is OFF, it is determined at S7 whether the own-vehicle-side distance Ds is greater than the end threshold value Dsb. When the own-vehicle-side distance Ds is less than or equal to the end threshold value Dsb, it is considered that there is a possibility of the departure. Thus, a negative decision (NO) is made at S7, and the processings at S1, S2, S6, and S7 are repeated to continue the LDA control. When the own-vehicle-side distance Ds becomes greater than the end threshold value Dsb, the steering ECU 12 at S8 outputs an instruction for stopping the LDA control. The steering ECU 12 controls the electric motor 21 to terminate the LDA control. When the cancel flag is ON, a positive decision (YES) is made at 6. In this case, the instruction for stopping the electric motor 21 is output at S8 without execution of the processing at S7. Even when the own-vehicle-side distance Ds is less than or equal to the end threshold value Dsb, the LDA control is terminated.

When an inhibiting condition is satisfied, for example, when an absolute value of steering torque Ts is greater than an inhibition threshold value Tsth, the LDA control inhibitor 48 sets the cancel flag to ON to inhibit the LDA controller 46 from executing the LDA control. The inhibition threshold value Tsth is determined by a threshold-value determiner 54. For example, it is determined that the inhibiting condition is satisfied, and the cancel flag is set to ON, when at least one of the following cases is satisfied: a case where the absolute value of the steering torque Ts detected by the steering-torque sensor 26 is greater than the inhibition threshold value Tsth; a case where the direction indicating switch 16 is ON; and a case where the hazard-lamp switch 18 is ON. When the cancel flag is ON, the LDA control is not started, and the LDA control being executed is terminated.

When the absolute value of the steering torque Ts is greater than the inhibition threshold value Tsth, it is estimated that the driver intends to depart from the own lane S by changing the lane or bringing the own vehicle 8 to one side for parking, for example. Thus, when the absolute value of the steering torque Ts is greater than the inhibition threshold value Tsth, execution of the LDA control is not preferable, and the cancel flag is set to ON. The same operations are performed for the cases of the direction indicating switch 16 and the hazard-lamp switch 18. Furthermore, it is also estimated that the absolute value of the steering torque Ts becomes greater than the inhibition threshold value Tsth, when the steering operation in the direction in which the own vehicle 8 avoids the specific object OV is performed.

Figure 3:
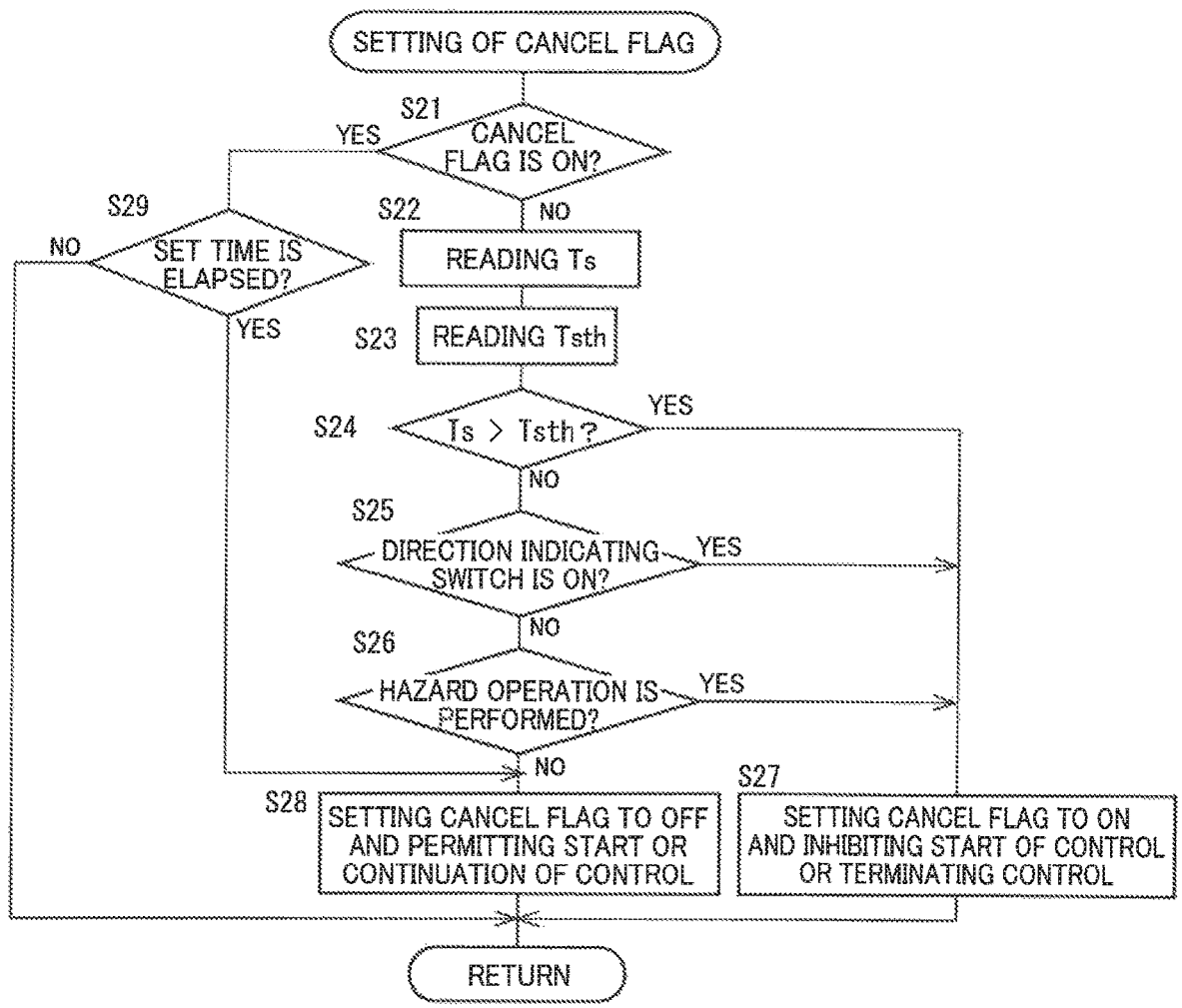
FIG. 3 is a flow chart representing a procedure of a cancel-flag setting program stored in a storage of a driving support ECU of the own vehicle.

The cancel flag is determined by execution of a cancel-flag setting program. FIG. 3 is a flow chart representing a flow of the cancel-flag setting program. This flow begins with S21 at which it is determined whether the cancel flag is ON. When the cancel flag is OFF, the steering torque Ts is read at 522. The inhibition threshold value Tsth is read at 523. It is determined at S24 whether the absolute value of the steering torque Ts is greater than the inhibition threshold value Tsth. It is determined at S25 whether the direction indicating switch 16 is ON. It is determined at S26 whether the hazard-lamp switch 18 is ON. When a positive decision (YES) is made at at least one of S24-S26, the cancel flag is set to ON at S27. That is, the LDA control is inhibited. When negative decisions (NO) are made at S24-26, the cancel flag is set to OFF at S28. That is, start of the LDA control is permitted, and continuation of the LDA control being executed is permitted.

When the cancel flag is ON, it is determined at S29 whether a set length of time is elapsed. Before the set length of time is elapsed, the processings at S21 and S29 are repeated, and the cancel flag is kept ON. When the set length of time is elapsed, a positive decision (YES) is made at S29, and the cancel flag is set to OFF at S28. Thus, the cancel flag is turned to ON and then to OFF in the set length of time. This is because it is not preferable that a state in which the cancel flag is ON, i.e., a state in which the LDA control is inhibited continues for a long time.

The threshold-value determiner 54 is configured to determine the inhibition threshold value Tsth. The inhibition threshold value Tsth is determined based on environment information and unevenness of a road surface as an external disturbance, for example. The environment information is obtained by the environment obtainer 42 and indicates the relative positional relationship between the object X and the own vehicle 8. Examples of the environment information include the vehicle-to-object distance, the object-side distance, the approach velocity, the direction directed from the own vehicle 8 to the object X, the presence or absence of the appeared object, and the reaching estimated time required for the own vehicle 8 to reach the appeared object.

The inhibition threshold value Tsth is determined to a smaller value when there is the object X having the specific relationship with the own vehicle 8 as the relative positional relationship, i.e., the specific object OV, than when there is no specific object OV. In the present embodiment, when the specific object OV is absent, the inhibition threshold value Tsth is set to a value A. The value A may be a value which enables clear recognition of the presence of driver's intention of operating the own vehicle 8 so as to depart from the lane, for example, driver's intention of changing the lane or bringing the own vehicle 8 to an outside of the lane for parking. In this case, the LDA control is less likely to be inhibited and more likely to be executed.

Figure 9:
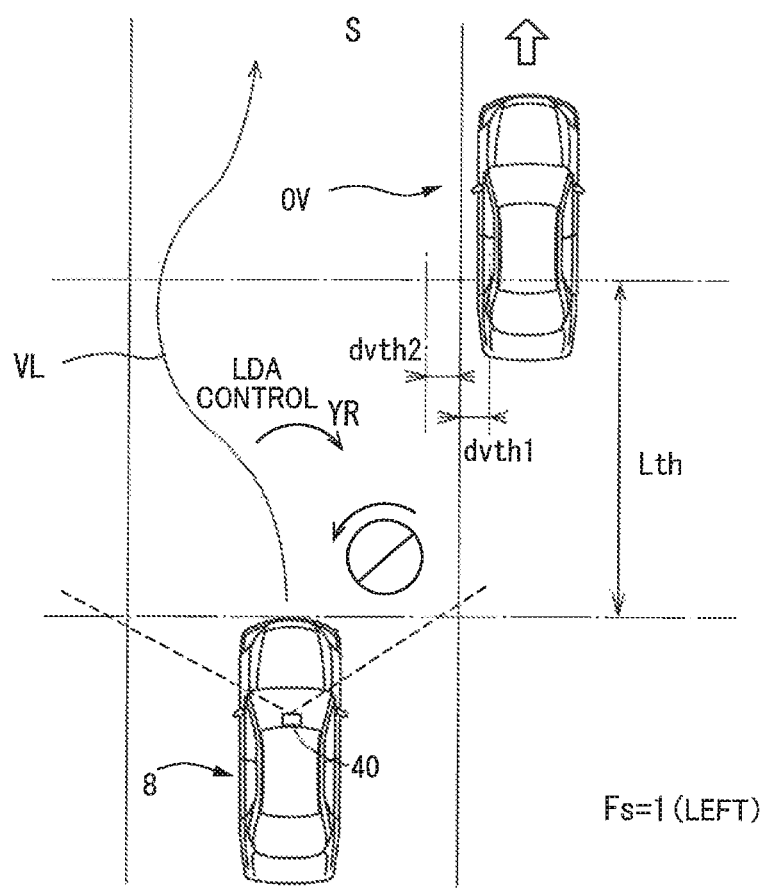
FIG. 9 is a view illustrating a relative positional relationship between an own vehicle and a specific object in the case where a driver feels a not-normal feeling.

When the specific object OV is present on a front right side of the own vehicle 8 as illustrated in FIG. 9, for example, the driver performs the steering operation in the left direction to bring the own vehicle 8 away from the object X along a path VL. If the LDA control is executed in this state, steering torque in the right direction (indicated by arrow YR) is applied to the steering mechanism. Since the direction of the steering operation performed by the driver (i.e., the left direction) and the direction of the applied steering torque are opposite to each other, a not-normal feeling is given to the driver.

Figure 10:
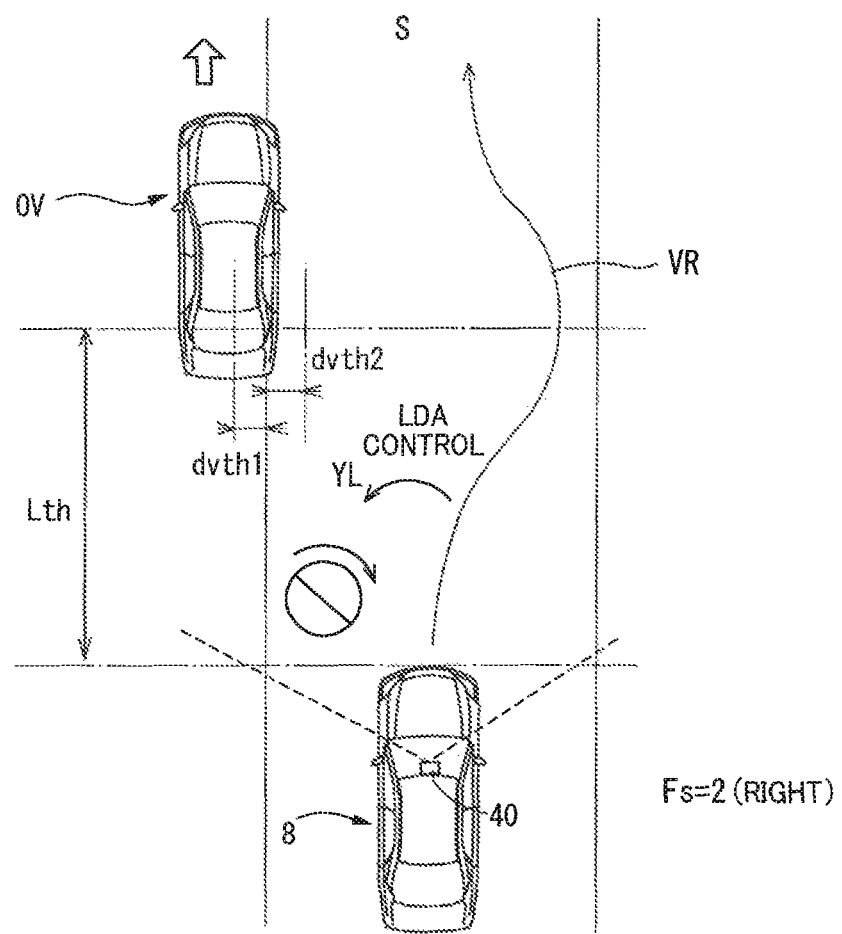
FIG. 10 is a view illustrating another relative positional relationship between the own vehicle and the specific object in the case where the driver feels the not-normal feeling.

Likewise, when the specific object OV is present on a front left side of the own vehicle 8, as illustrated in FIG. 10, the driver performs the steering operation in the right direction to bring the own vehicle 8 away from the object X along a path VR. If the LDA control is executed in this state, steering torque in the left direction (indicated by arrow YL) is applied to the steering mechanism, giving the not-normal feeling to the driver.

To solve this problem, in the present embodiment, in the case where the specific object OV is present, the inhibition threshold value Tsth is set to a value which is less than the value A. Thus, even when the absolute value of the steering torque is less than the value A, the LDA control is inhibited in some cases. This makes it difficult for the LDA control to be executed, making it difficult for the driver to feel the not-normal feeling.

It is noted that, even in the case where the inhibition threshold value Tsth is set to a smaller value when the specific object OV is present than when the specific object OV is absent, the inhibition threshold value Tsth may be set to a smaller value when the specific object OV is present, and the steering operation in the direction in which the own vehicle 8 avoids the specific object OV is performed by the driver, than when the specific object OV is present, and the steering operation in the direction in which the own vehicle 8 avoids the specific object OV is not performed by the driver.

The inhibition threshold value Tsth is determined to a larger value when the unevenness of the road surface is large than when the unevenness of the road surface is small. Since the steering wheel 24 and the steered road wheels are mechanically connected to each other via the electric power steering device 22 and other similar components, a road input received by the steered road wheels is transmitted to the steering wheel 24. Thus, the absolute value of the steering torque Ts applied by the driver to hold the steering wheel 24 is larger in the case where the unevenness of the road surface is large, the road input received by the steered road wheels is large, and the external disturbance is large as illustrated in FIG. 8B, than in the case where the unevenness of the road surface is small, the road input received by the steered road wheels is small, and the external disturbance is small as illustrated in FIG. 8A. If the inhibition threshold value Tsth is a value C illustrated in FIG. 8A in the case where the external disturbance is large, the absolute value of the steering torque Ts in some cases exceeds the inhibition threshold value Tsth due to unevenness of the road surface without the steering operation of the driver, leading to inhibition of the LDA control. In the case where the threshold value is set to a value B illustrated in FIG. 8B (which is greater than the value C) regardless of the degree of the unevenness of the road surface, even when the steering operation for operating the own vehicle 8 to avoid the specific object OV is performed by the driver, the LDA control is not inhibited in some cases, leading to driver's not-normal feeling.

In the present embodiment, in contrast, when the degree of the unevenness of the road surface is large, the inhibition threshold value Tsth is increased. This increase makes it difficult for the absolute value of the steering torque due to the road input to exceed the inhibition threshold value Tsth, making it difficult for the LDA control to be inhibited, regardless of the intention of the driver. When the degree of the unevenness of the road surface is small, the inhibition threshold value Tsth is reduced. This reduction makes it difficult for the driver to feel the not-normal feeling.

The magnitude of the road input as the external disturbance, in other words, the degree of the unevenness of the road surface may be obtained based on the steering torque, for example. As illustrated in FIGS. 8A and 8B, the amplitude of the steering torque and the maximum value of the absolute value are larger when the unevenness of the road surface is large than when the unevenness of the road surface is small. Thus, in the present embodiment, as illustrated in FIG. 8C, the maximum value Tsmax of the absolute value of the steering torque Ts within the past set length of time TP from a current time point P is obtained as a value representing the degree of the unevenness of the road surface.

The degree of the unevenness of the road surface is obtained according to a road-surface-unevenness obtaining program illustrated in the flow chart in FIG. 7. This flow begins with S31 at which an absolute value |θ| of an operated angle of the steering wheel 24 which is detected by the operation-angle sensor 28 is less than an operation-angle threshold value θth that is close to zero. In other words, it is determined whether the steering wheel 24 is located substantially at the reference position, and the own vehicle 8 is driving straight ahead. When the steering wheel 24 is located substantially at the reference position, the electric motor 21 applies no or considerably small steering torque, making it possible to obtain steering torque related to the road input. At S32, a value detected by the steering-torque sensor 26 is stored. At S33, data within the predetermined set length of time TP is processed. At S34, the maximum value Tsmax of the absolute value of the steering torque Ts within the set length of time TP is obtained.

In the present embodiment, when the maximum value Tsmax is greater than a road-surface-unevenness determination threshold value Tsx, it is determined that the external disturbance is large, and the road-surface unevenness is large. Thus, the inhibition threshold value Tsth is set to a large value. It is noted that a filter processing for removing low frequencies may be executed to remove steering torque produced by a slow steering operation of the driver.

The inhibition threshold value Tsth is determined to a smaller value when an appearance distance is short than when the appearance distance is long. The appearance distance is a vehicle-to-object distance with consideration of the relative velocity. The appearance distance corresponds to the reaching estimated time to required for the own vehicle 8 to reach the appeared object. A necessity for the own vehicle 8 to avoid the appeared object more promptly is higher when the appearance distance (corresponding to the reaching estimated time) is short than when the appearance distance is long. Thus, when the appearance distance is short, it is preferable to make it difficult for the LDA control to be executed. For example, the appeared object is detected in some cases at a joining point or by a lane change of another vehicle. In these cases, the reaching estimated time may become short. In the present embodiment, when the appearance distance tc is less than a set length of time tcx (which may be referred to as "set appearance distance"), it is determined that the appearance distance is short. Thus, the inhibition threshold value Tsth is set to a small value.

While the inhibition threshold value Tsth is determined as described above, in the present embodiment, a higher priority is given to the road-surface unevenness than to the appearance distance. When the maximum value Tsmax of the absolute value of the steering torque is greater than the road-surface-unevenness determination threshold value Tsx, the inhibition threshold value Tsth is set to the value B regardless of the appearance distance. For example, the value B may be a value which is slightly greater than the maximum value Tsmax of the absolute value of the steering torque in the case where assumed unevenness of the road surface is large. The value B is less than the value A.

When the maximum value Tsmax of the absolute value of the steering torque is less than or equal to the road-surface-unevenness determination threshold value Tsx, the inhibition threshold value Tsth is determined based on the appearance distance. When the appearance distance tc is less than the set length of time tcx, the inhibition threshold value Tsth is set to the value C. When the appearance distance tc is greater than or equal to the set length of time tcx, the inhibition threshold value Tsth is set to the value B. The value C may be a value easily reachable when the steering operation is performed by the driver. The value C may be less than the value B. In the case where the inhibition threshold value Tsth is set to the value C, the LDA control is more likely to be inhibited and less likely to be executed.

Figure 4A:
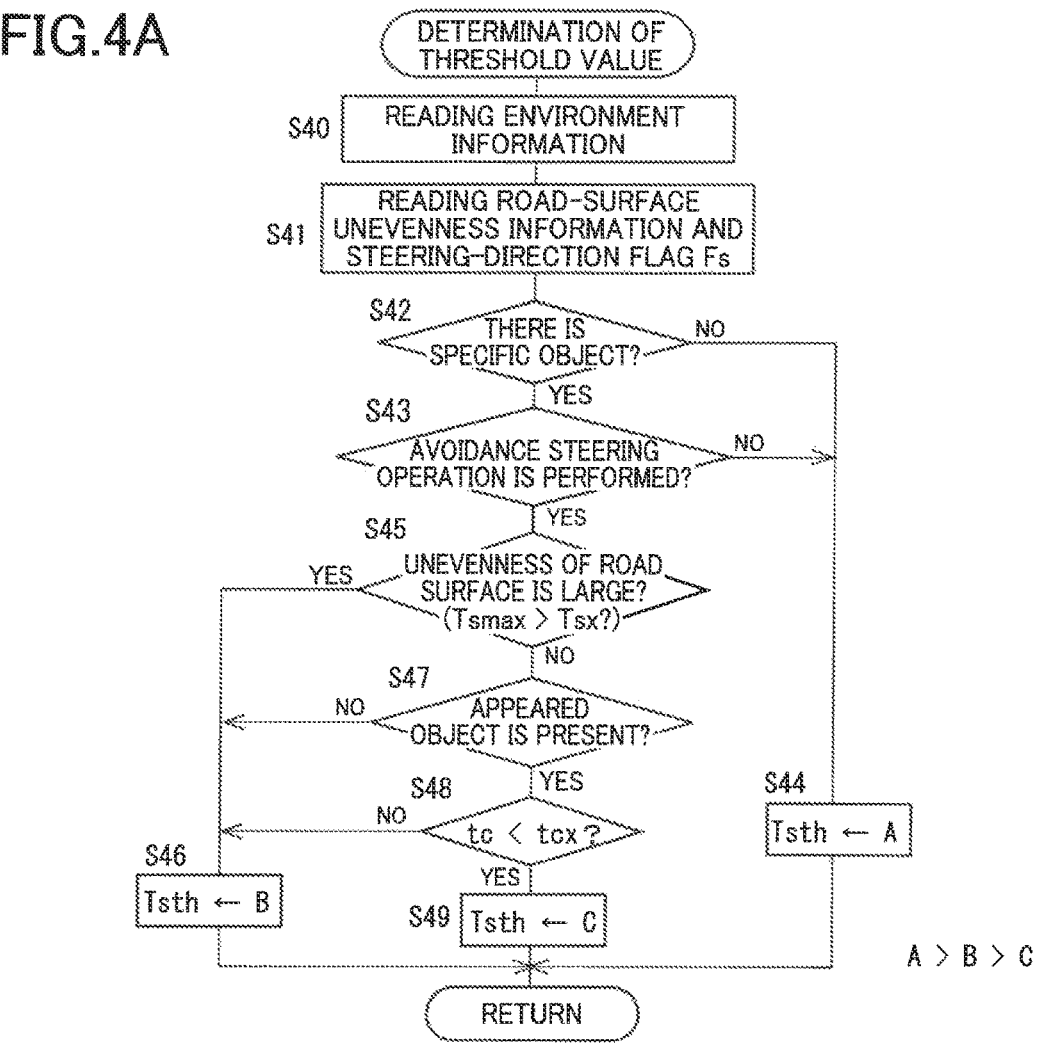
FIG. 4A is a flow chart representing a procedure of a threshold-value determination program stored in the storage.

The inhibition threshold value Tsth is determined by execution of the threshold-value determination program. FIG. 4A is a flow chart representing a flow of the threshold-value determination program. This flow begins with S40 at which the environment information is read. At S41, road-surface unevenness information (the maximum value Tsmax of the steering torque) and the steering-direction flag Fs are read. At S42, it is determined whether the specific object OV is present. When the specific object OV is absent, the inhibition threshold value Tsth is set to the value A at 844. Since the specific object OV is absent, the LDA control is executed more easily.

Figure 4B:
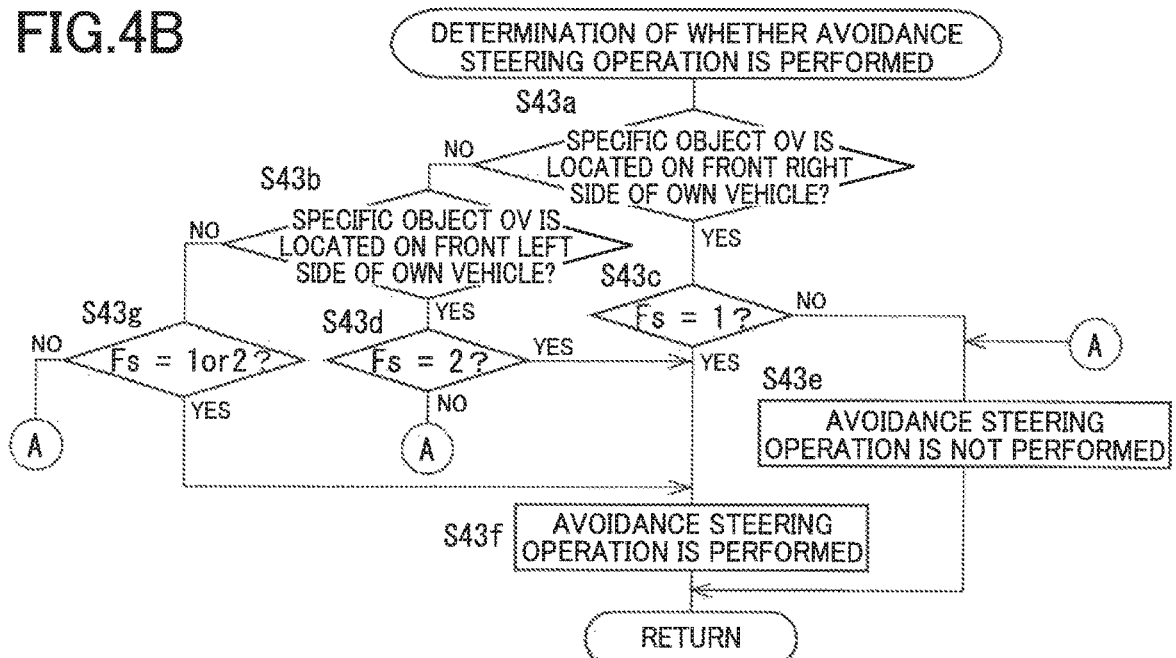
FIG. 4B is a flow chart representing a procedure of a portion of the threshold-value determination program (determination of the presence or absence of an avoidance steering operation)

When the specific object OV is present, it is determined at S43 whether the driver has performed the steering operation in the direction in which the own vehicle 8 avoids the specific object OV (noted that this operation may be hereinafter referred to as "avoidance steering operation"). As illustrated in FIG. 4B, it is determined at S43a and S43b whether the specific object OV is located on a front right side or a front left side of the own vehicle 8. When the specific object OV is located on a front right side of the own vehicle 8, it is determined at S43c whether the steering-direction flag Fs is 1. That is, it is determined whether the steering wheel 24 is operated in the left direction. When the specific object OV is located on a front left side of the own vehicle 8, it is determined at S43d whether the steering-direction flag Fs is 2. That is, it is determined whether the steering wheel 24 is operated in the right direction. When a negative decision (NO) is made at S43c or S43d, it is determined at S43e that the driver has not performed the steering operation for bringing the own vehicle 8 away from the specific object OV, i.e., the steering operation in the direction in which the own vehicle 8 avoids the specific object OV.

When a positive decision (YES) is made at S43c or S43d, it is determined at S43f that the driver has performed the steering operation for bringing the own vehicle 8 away from the specific object OV, i.e., the avoidance steering operation. When the object-side distance dv is less than the second set object-side distance dvth2, negative decisions are made at S43a and S43b. It is determined that the specific object OV is located on a front side of the own vehicle 8. When the steering-direction flag Fs is 1 or 2, a positive decision (YES) is made at S43g, and it is determined at S43f that the driver has performed the avoidance steering operation for avoiding the specific object OV. However, when the steering-direction flag Fs is 0 and when the own vehicle 8 is, for example, decelerated, a negative decision (NO) is made at S43g, it is determined at S43e that the avoidance steering operation has not been performed.

When the avoidance steering operation is not performed even though the specific object OV is present, the inhibition threshold value Tsth is set to the value A at S44. This is because the driver feels no not-normal feeling even if the LDA control is executed. When the avoidance steering operation is performed, the processings at S45 and subsequent steps are executed. If the LDA control is executed, the driver feels the not-normal feeling. Thus, the inhibition threshold value Tsth is set to the value smaller than the value A to make it difficult for the LDA control to be executed.

It is determined at S45 whether the degree of the unevenness of the road surface is large. That is, it is determined whether the maximum value Tsmax of the absolute value of the steering torque is greater than the road-surface-unevenness determination threshold value Tsx. When it is determined that the road-surface unevenness is large, the inhibition threshold value Tsth is set to the value B at 846. That is, the inhibition threshold value Tsth is set to a value which is not easily exceeded by the absolute value of the steering torque caused by the road input, making it difficult for the LDA control to be inhibited against intention of the driver.

When the maximum value Tsmax of the steering torque is less than or equal to the road-surface-unevenness determination threshold value Tsx, it is determined at S47 whether the appeared object is present. When the appeared object is present, it is determined at S48 whether the appearance distance, i.e., the reaching estimated time tc is less than the set length of time tcx. When the appeared object is absent or when the reaching estimated time tc is greater than or equal to the set length of time tcx, the inhibition threshold value Tsth is set to the value B at S46. When the reaching estimated time tc required for the own vehicle 8 to reach the appeared object is less than the set length of time tcx, the inhibition threshold value Tsth is set to the small value C at S49. That is, the LDA control is more likely to be inhibited and less likely to be executed.

In the present embodiment as described above, the LDA control is inhibited more easily when the specific object OV is present and when the driver has performed the steering operation for operating the own vehicle 8 to avoid the specific object OV. That is, it becomes difficult for the LDA control to be executed, making it difficult for the driver to feel the not-normal feeling. Also, when the appearance distance is short, the inhibition threshold value Tsth is set to a small value. Thus, when the driver has performed the steering operation for operating the own vehicle 8 to avoid the appeared object OV, the LDA control is inhibited much more easily, making it more difficult for the driver to feel the not-normal feeling. Also, the inhibition threshold value Tsth is determined based on the degree of the unevenness of the road surface, leading to reduction of occurrence of a situation in which the absolute value of the steering torque received due to the road input exceeds the inhibition threshold value Tsth, and thereby it is difficult for the LDA control to be inhibited without driver's intention.

The electric power steering device 22 is one example of a supporting device. The driving supporter is constituted by devices and components including the electric power steering device 22, the steering-torque sensor 26, the driving support ECU 10, and the camera 40. A support controller is constituted by devices including the LDA controller 46 and the steering ECU 12. A support inhibitor is constituted by devices including the LDA control inhibitor 48 and the steering-torque sensor 26.

A threshold-value determiner is constituted by portions of the driving support ECU 10 which store and execute the threshold-value determination program in FIG. 4A. Each of an external-disturbance-dependent threshold-value determiner and a road-surface-unevenness-dependent threshold-value determiner is constituted by portions of the driving support ECU 10 which store and execute the processings at S45, S46, and S49 in the threshold-value determination program in FIG. 4A. An appeared-object-dependent threshold-value determiner is constituted by portions of the driving support ECU 10 which store and execute the processings at S47, S48, S46, and S49. Each of an external-disturbance obtainer and a road-surface-unevenness obtainer is constituted by the steering-torque sensor 26 and portions of the driving support ECU 10 which store and execute the road-surface-unevenness obtaining program in FIG. 7, for example. The road-surface-unevenness determination threshold value is one example of a set external-disturbance value. The steering torque is one example of a steering operation value.

The inhibition threshold value Tsth takes one of the three values in the above-described embodiment but may take one of four or more values or may be continuously changed based on a value representing the degree of the road-surface unevenness (e.g., the maximum value Tsmax of the steering torque) or based on the appearance distance tc, for example. In the case where a side wind blows against the own vehicle 8 as the external disturbance, a degree of the side wind may be used instead of the unevenness of the road surface. For example, when the absolute value of the steering angle of the steering wheel 24 is small, and the absolute value of the steering torque is large, it is possible to consider that the side wind is strong, and the inhibition threshold value Tsth may be determined to the value B.

The driving supporter includes a plurality of the computers in the present embodiment but may include a single computer. While the camera is one example of an object-information obtainer in the present embodiment, the object-information obtainer may include at least one of the camera and a radar device. The image obtained by the camera and a signal obtained by the radar device are examples of object information, for example. The environment obtainer may be configured to obtain an environment in the area identified based on at least one of an image taken by the camera and a laser or a signal output from the radar device, for example.

Second Embodiment

Figure 11:
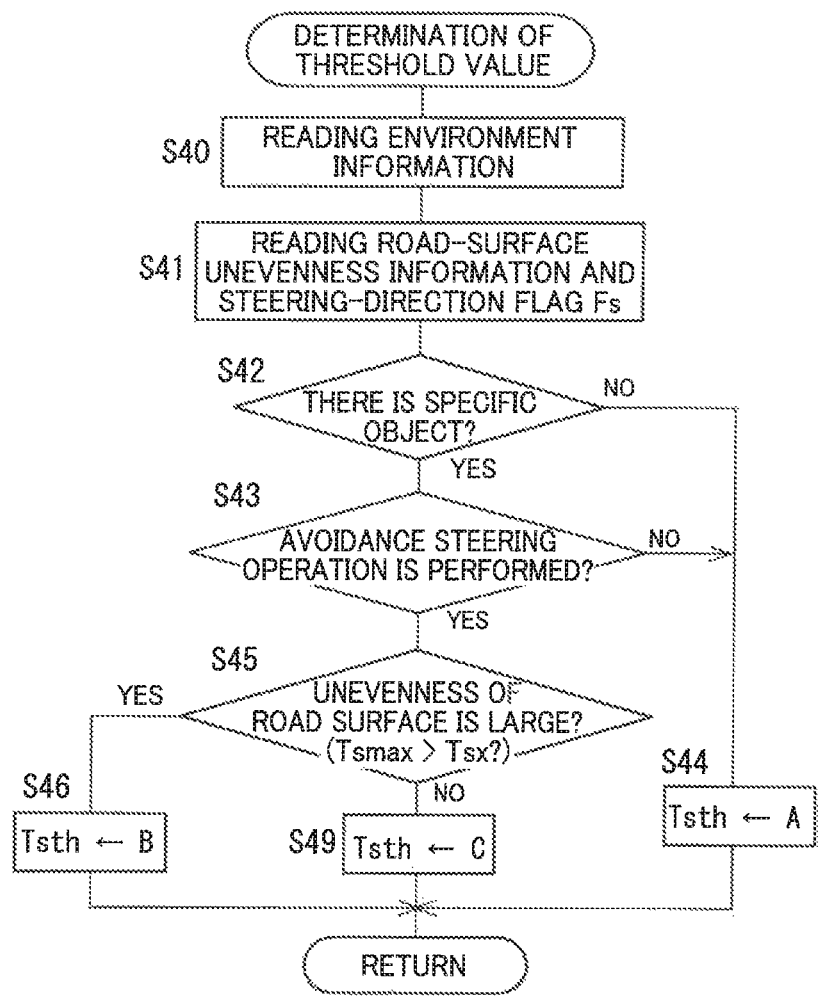
FIG. 11 is a flow chart representing a procedure of another threshold-value determination program stored in the storage.

It is not essential to determine the inhibition threshold value Tsth based on the presence or absence of the specific object OV, the presence or absence of the avoidance steering operation, the road-surface unevenness, and the appearance distance. For example, as illustrated in FIG. 11, the inhibition threshold value Tsth may be determined based on the presence or absence of the specific object OV, the presence or absence of the avoidance steering operation, and the road-surface unevenness. In the present embodiment, when the specific object OV is present, and the avoidance steering operation is performed, and the unevenness of the road surface is large, the inhibition threshold value Tsth is set to the value B at S46. When the specific object OV is present, and the avoidance steering operation is performed, and the unevenness of the road surface is small, the inhibition threshold value Tsth is set to the value C at S49.

Figure 12:
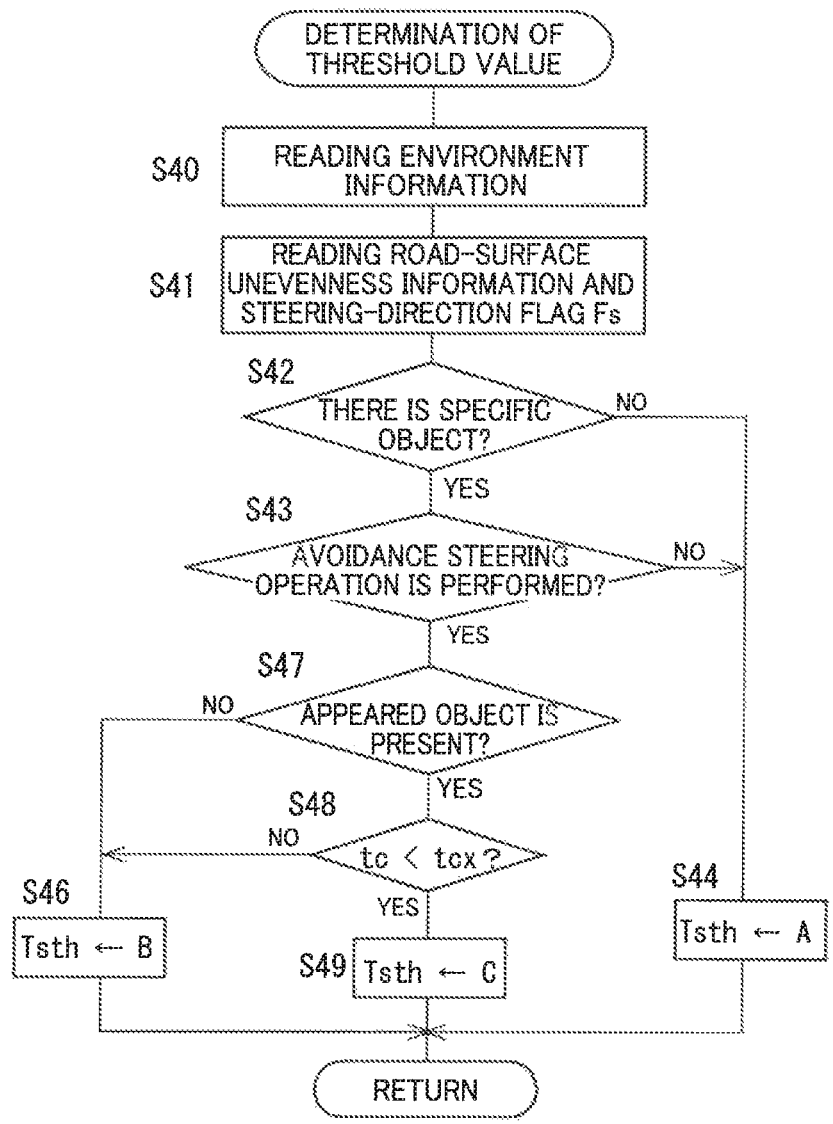
FIG. 12 is a flow chart representing a procedure of still another threshold-value determination program stored in the storage.

As illustrated in FIG. 12, the inhibition threshold value Tsth may be determined based on the presence or absence of the specific object OV, the presence or absence of the avoidance steering operation, and the appearance distance. In the present embodiment, when the specific object OV is present, and the avoidance steering operation is performed, and the appearance distance is long, the inhibition threshold value Tsth is set to the value B at S46. When the specific object OV is present, and the avoidance steering operation is performed, and the appearance distance is short, the inhibition threshold value Tsth is set to the value C at S49.

Figure 13:
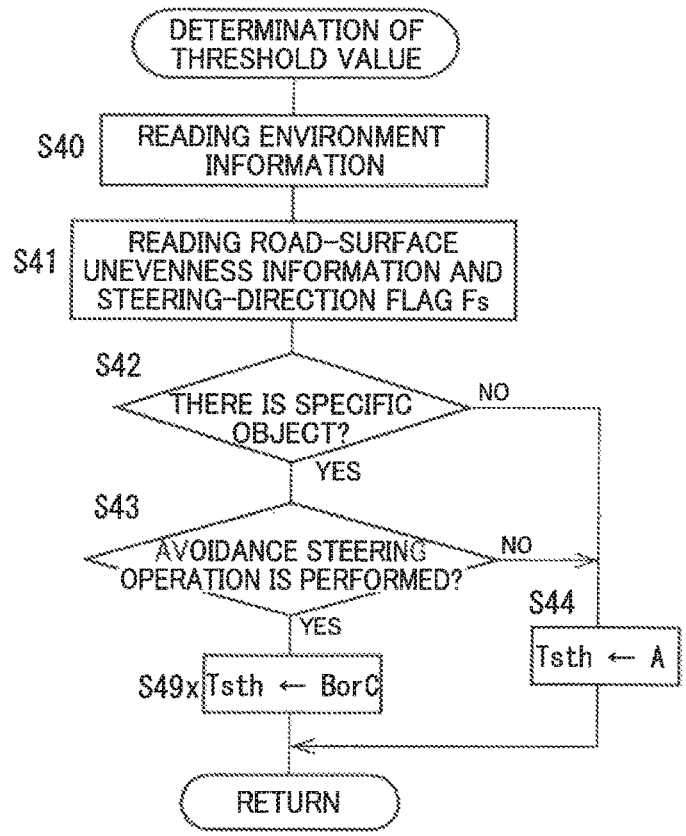
FIG. 13 is a flow chart representing a procedure of still another threshold-value determination program stored in the storage.

As illustrated in FIG. 13, the inhibition threshold value Tsth may be determined based on the presence or absence of the specific object OV and the presence or absence of the avoidance steering operation. In the present embodiment, when the specific object OV is absent or when the specific object OV is present, and the avoidance steering operation is not performed, the inhibition threshold value Tsth is set to the value A at S44. When the specific object OV is present, and the avoidance steering operation is performed, the inhibition threshold value Tsth is set to the value B or C at S49x.

Figure 14:
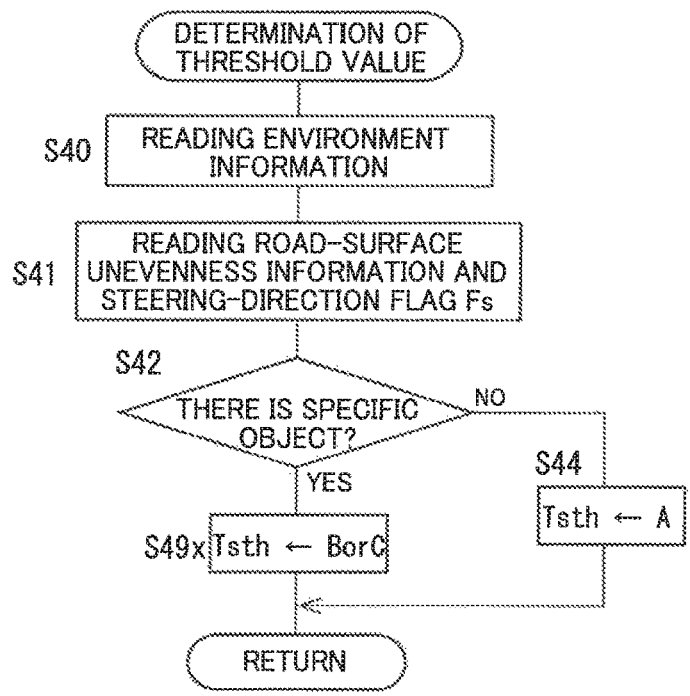
FIG. 14 is a flow chart representing a procedure of still another threshold-value determination program stored in the storage.

As illustrated in FIG. 14, when the specific object OV is present, the inhibition threshold value Tsth is determined to the value B or C at S49x, regardless of the presence or absence of the steering operation performed by the driver to operate the own vehicle 8 to avoid the specific object OV. When the specific object OV is absent, the inhibition threshold value Tsth is set to the value A at S44.

It is noted that the processing at S43 is not essential in the threshold-value determining routines represented in FIGS. 4 and 11-13. Also, the inhibition threshold value may not be determined based on the presence or absence of the avoidance steering operation performed by the driver, and in this case the avoidance steering operation may be added to a condition for setting the cancel flag.

Third Embodiment

The supporting device is the electric power steering device 22, and so on in the above-described embodiment but may be the notifier 14. In the case where the notifier 14 is a device configured to produce sounds and/or voices, a device configured to cause illumination or blinking of light, or a display, for example, a notifying operation performed by the notifier 14 is made difficult to reduce annoyance of the driver.

In the case where the notifier 14 is configured to produce sounds and voices, however, it is known that the driver is concerned more about the sounds and voices be heard by a passenger or passengers (an occupant and occupants different from the driver) than about the annoyance of the driver. Thus, in the case where there is no passenger, it is considered that there is a low necessity to make it difficult for the operation of the notifier 14, i.e., the LDA control to be executed. In view of the circumstances described above, in the case where the supporting device is the notifier 14 configured to produce sounds and voices, only when there is a passenger or passengers, the operation for making it difficult for the LDA control to be executed is preferably performed. Whether there is a passenger (passengers) is detected by the seating sensors 17b provided respectively for the passenger seats 17y provided in the own vehicle 8.

Figure 15:
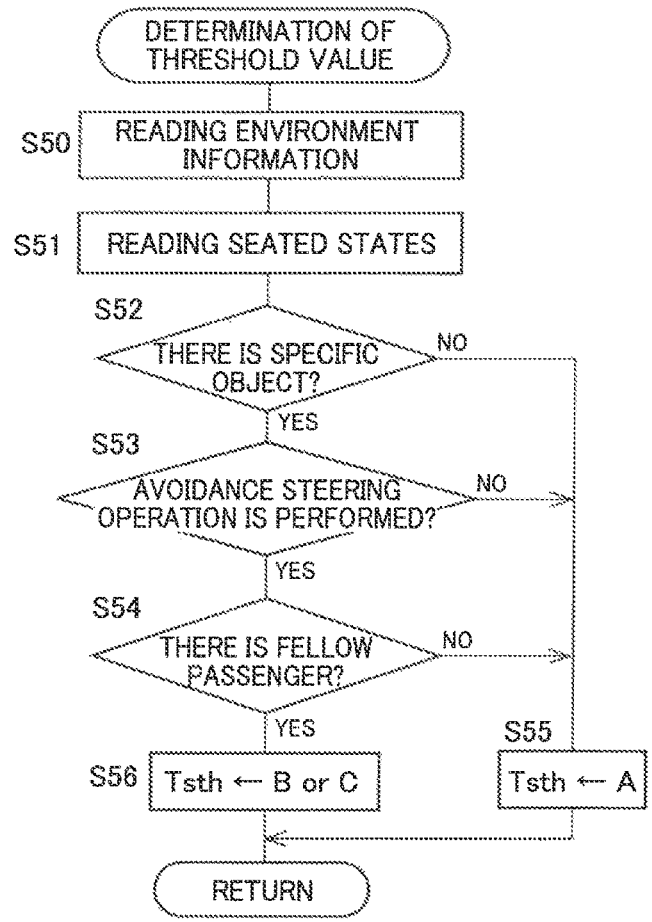
FIG. 15 is a flow chart representing a procedure of a threshold-value determination program stored in a storage in a driving supporter according to a second embodiment.

FIG. 15 is a flow chart representing a procedure of one example in this case. The environment information is read at S50. Values detected by the respective seating sensors 17b are read at S51. It is determined at S52 whether the specific object OV is present. When the specific object OV is present, it is determined at S53 whether the avoidance steering operation is performed. When the avoidance steering operation is performed, it is determined at S54 whether a passenger is present, based on the values detected by the seating sensors 17b. That is, it is determined whether there is a person in the own vehicle 8 in addition to the driver. When none of the seating sensors 17b detects seating of a person, for example, it is determined that there is no passenger, and a negative decision (NO) is made, and the inhibition threshold value Tsth is set to the value A at S55. When at least one of the seating sensors 17b detects seating of a person, the inhibition threshold value Tsth is set to the value B or C at S56.

In the present embodiment as described above, when the specific object and a passenger or passengers are present, the inhibition threshold value Tsth is reduced. This reduction makes it difficult for the passenger(s) to feel the not-normal feeling, resulting in reduced annoyance to the driver. In the present embodiment, a passenger-dependent threshold-value determiner is constituted by the seating detector 17 and portions of the driving support ECU 10 which store and execute the processings at S51 and S54-S56 in the threshold-value determination program in FIG. 15, for example.

In the case where the notifier 14 is configured to use body sensation of vibration of the steering wheel 24, vibration of a seatbelt, not illustrated, or vibration of the driver's seat, to make a notification about a possibility of a departure of the own vehicle 8 from the lane, it is considered that there is a low necessity to make it difficult for the LDA control to be executed, even when the specific object OV is present, for example. Thus, in the case where the notifier 14 is a device configured to use body sensation to make a notification about a possibility of a lane departure, it is possible to prevent reduction of the inhibition threshold value Tsth even when the specific object OV is present, for example.

In the case where the notifier 14 is configured to produce sounds and voices, for example, the inhibition threshold value Tsth may be set to the fixed value A regardless of the presence or absence of the specific object OV. It is noted that the processing at S53 is not essential.

Fourth Embodiment

Figure 16:
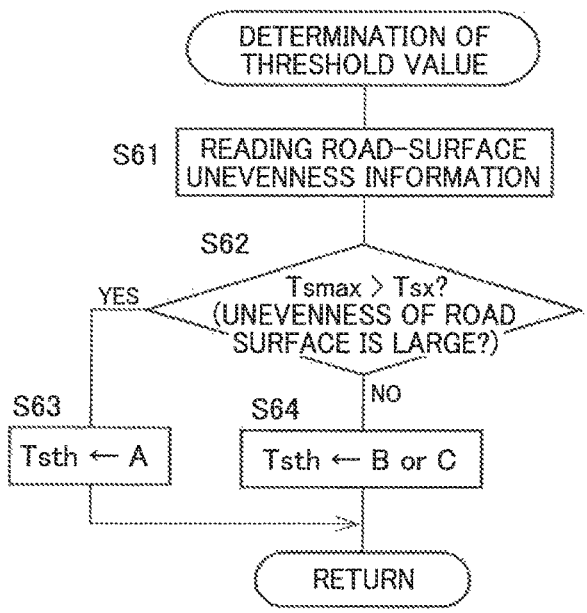
FIG. 16 is a flow chart representing a procedure of a threshold-value determination program stored in a storage in a driving supporter according to a third embodiment.

It is not essential to consider the presence or absence of the specific object OV to determine the inhibition threshold value Tsth. The inhibition threshold value Tsth may be determined based on the unevenness of the road surface. FIG. 16 is a flow chart representing a procedure of one example in this case. In the present embodiment, the state of the road-surface unevenness is obtained at S61. It is determined at S62 whether the degree of the unevenness of the road surface is large. When the degree of the road-surface unevenness is small, the inhibition threshold value Tsth is set to the value B or C at S64. When the unevenness of the road surface is large, the inhibition threshold value Tsth is set to the value A at S63. Also in the present embodiment, even when the unevenness of the road surface is large, and a change due to the external disturbance of the steering torque is large, it is possible to accurately detect whether the steering operation is performed by the driver, making it difficult for the LDA control to be inhibited against the intention of the driver. In the present embodiment, a road-surface-unevenness-dependent threshold-value determiner is constituted by portions of the driving support ECU 10 which store and execute the threshold-value determination program in FIG. 16, for example.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

CLAIMABLE INVENTIONS

There will be described claimable inventions in the following forms.

(1) A driving supporter configured to perform support of driving such that an own vehicle drives within a lane, the driving supporter comprising:
an object-information obtainer configured to obtain object information relating to at least an object in an area;
an environment obtainer configured to obtain a relative positional relationship between the own vehicle and the object located in the area and identified based on the object information obtained by the object-information obtainer; and
a support inhibitor configured to inhibit the support of the driving when an absolute value of a steering operation value representing a magnitude of a steering operation performed by a driver is greater than an inhibition threshold value,
the support inhibitor comprising a threshold-value determiner configured to determine the inhibition threshold value to a smaller value when the relative positional relationship between the object and the own vehicle which is obtained by the environment obtainer is a specific relationship in which it is estimated that the driver is to perform a steering operation in a direction in which the own vehicle avoids the object, than when the relative positional relationship between the object and the own vehicle which is obtained by the environment obtainer is not the specific relationship.

The driving supporter may include a departure-prevention support device configured to support driving to prevent a departure of the own vehicle from the lane and may include a lane-keeping support device configured to support driving such that the own vehicle travels along a target traveling line extending on a substantially center of the lane, for example. Examples of the steering operation value include: steering torque produced by an operation of the steering operation member by the driver; a steering force; a value representing a magnitude of the speed of the operation of the steering operation member; and a value representing an amount of steering of the steering operation member. Examples of the object include a vehicle, a person, a guard rail, and a wall. It is noted that examples of the case where the relative positional relationship between the object and the own vehicle is not the specific relationship include: a case where the relative positional relationship is not the specific relationship even when the object is present in the area identified according to the object information obtained by the object-information obtainer; and a case where there is no object in the area according to the object information obtained by the object-information obtainer.

(2) The driving supporter according to the above form (1), the threshold-value determiner comprises an appeared-object-dependent threshold-value determiner configured to determine the inhibition threshold value to a smaller value when an estimated time required for the own vehicle to reach an appeared object that is the object obtained first by the environment obtainer is short, than when the estimated time required for the own vehicle to reach the appeared object is long.

The appeared-object-dependent threshold-value determiner may include an appeared-object detector configured to detect the appeared object. A relative positional relationship between the appeared object and the own vehicle is usually the specific relationship. In many cases, the appeared object appears at a joining point or upon lane change of another vehicle, for example. In the case where the estimated time required for the own vehicle to reach the appeared object is short, the driver feels a high necessity of operating the own vehicle to avoid the appeared object. Thus, it is further preferable to make it difficult for the driving support to be executed.

(3) The driving supporter according to the above form (1) or (2), wherein the threshold-value determiner comprises:

an external-disturbance obtainer configured to obtain a magnitude of an external disturbance acting on the own vehicle; and an external-disturbance-dependent threshold-value determiner configured to determine the inhibition threshold value to a larger value when the magnitude of the external disturbance which is obtained by the external-disturbance obtainer is large, than when the magnitude of the external disturbance which is obtained by the external-disturbance obtainer is small.

Examples of the external disturbance include unevenness of a road surface and a side wind. The external disturbance affects the steering operation value. It is difficult in many cases to distinguish whether the absolute value of the steering operation value has exceeded the inhibition threshold value due to the external disturbance or the steering operation performed by the driver.

(4) The driving supporter according to the above form (3), wherein the own vehicle comprises a steering mechanism mechanically coupling a steered road wheel and a steering operation member operable by the driver, wherein the driving supporter further comprises a steering-torque sensor configured to detect steering torque applied to the steering mechanism via the steering operation member by the driver, and wherein the external-disturbance obtainer is configured to obtain greater unevenness of a road surface as the external disturbance in a state in which the steering operation member is located at substantially a reference position, when an absolute value of a value detected by the steering-torque sensor is large than when the absolute value of the value detected by the steering-torque sensor is small.

For example, the driver applies great steering torque to hold the steering operation member in the case where the unevenness of the road surface is large, and the external disturbance as the road input is large or in the case where a side wind is strong, and the external disturbance is large, for example. Thus, it is possible to consider that the external disturbance is larger when the absolute value of the steering torque is large than when the absolute value of the steering torque is small, in a state in which the steering operation member is located at substantially the reference position, in other words, in a state in which the vehicle is driving substantially straight ahead. The steering operation member is located at the reference position when the vehicle is driving straight ahead. When the steering operation member is located at the reference position, an absolute value of a value detected by an operation amount sensor configured to detect an amount of operation of the steering operation member is less than or equal to an operation-amount threshold value. The large unevenness of the road surface means a large difference in height of the unevenness. For example, the magnitude of the road input due to the unevenness of the road surface is larger when the difference in the height of the unevenness of the road surface is large than when the difference in the height of the unevenness of the road surface is small. Thus, the degree of the unevenness of the road surface can be represented as the magnitude of the road input.

It is noted that the degree of the unevenness of the road surface may also be obtained based on an image taken by a camera, for example.

(5) The driving supporter according to the above form (3) or (4), wherein the external-disturbance-dependent threshold-value determiner is configured to, when the relative positional relationship between the object and the own vehicle which is obtained by the environment obtainer is the specific relationship, determine the inhibition threshold value to a value that is greater when the magnitude of the external disturbance is large than when the magnitude of the external disturbance is small.

The inhibition threshold value taken in the case where the external disturbance is large is determined to a value that is less than the inhibition threshold value taken in the case where the relative positional relationship between the object and the own vehicle is not the specific relationship.

(6) The driving supporter according to the above form (5), wherein the external-disturbance-dependent threshold-value determiner is configured to determine the inhibition threshold value to a larger value when the magnitude of the external disturbance which is obtained by the external-disturbance obtainer is greater than a set external-disturbance value, than when the magnitude of the external disturbance which is obtained by the external-disturbance obtainer is less than or equal to the set external-disturbance value, wherein the threshold-value determiner comprises an appeared-object-dependent threshold-value determiner configured to determine the inhibition threshold value to a smaller value when the object whose relative positional relationship with the own vehicle is the specific relationship is an appeared object that is an object detected first by the environment obtainer and when an estimated time required for the own vehicle to reach the appeared object is short, than when the estimated time required for the own vehicle to reach the appeared object is long, and wherein the appeared-object-dependent threshold-value determiner is configured to, when the magnitude of the external disturbance which is obtained by the external-disturbance obtainer is less than or equal to the set external-disturbance value, determine the inhibition threshold value to a smaller value when the estimated time required for the own vehicle to reach the appeared object is short, than when the estimated time required for the own vehicle to reach the appeared object is long.

A higher priority is given to the external-disturbance-dependent threshold-value determiner than the appeared-object-dependent threshold-value determiner. When the magnitude of the external disturbance is larger than the set external-disturbance value, the inhibition threshold value is determined to a large value regardless of the reaching estimated time. The state in which the magnitude of the external disturbance is larger than the set external-disturbance value is a state in which the steering operation value is greatly affected by the external disturbance, and there is a high possibility that the external disturbance makes the absolute value of the steering operation value higher than the inhibition threshold value. Thus, it is appropriate to determine the inhibition threshold value to a large value regardless of the reaching estimated time. In contrast, the state in which the magnitude of the external disturbance is less than or equal to the set external-disturbance value is a state in which an effect of the external disturbance on the steering operation value is small, and there is a low necessity that the absolute value of the steering operation value exceeds the inhibition threshold value due to the external disturbance even when the inhibition threshold value is small. Thus, it is appropriate that the inhibition threshold value is determined by the appeared-object-dependent threshold-value determiner, and it is possible to accurately determine whether the absolute value of the steering operation value due to the steering operation performed by the driver exceeds the inhibition threshold value.

(7) The driving supporter according to the above form (6), wherein the appeared-object-dependent threshold-value determiner is configured to, when the estimated time required for the own vehicle to reach the appeared object is greater than a set reaching estimated time, determine the inhibition threshold value to a value that is less than or equal to the inhibition threshold value determined by the external-disturbance-dependent threshold-value determiner when the magnitude of the external disturbance is greater than the set external-disturbance value.

(8) The driving supporter according to any one of the above forms (3) through (7), wherein the external-disturbance obtainer comprises a road-surface-unevenness obtainer configured to obtain a degree of unevenness of a road surface on which the own vehicle is running, and wherein the external-disturbance-dependent threshold-value determiner comprises a road-surface-unevenness-dependent threshold-value determiner configured to determine the inhibition threshold value to a larger value when the degree of the unevenness of the road surface which is obtained by the road-surface-unevenness obtainer is large, than when the degree of the unevenness of the road surface which is obtained by the road-surface-unevenness obtainer is small.

(9) The driving supporter according to any one of the above forms (1) through (8), wherein the threshold-value determiner is configured to, when the relative positional relationship is (i) a relationship in which an object-side distance that is a distance between the object and a lane line defining an own lane on which the own vehicle is running is less than or equal to a set object-side distance and (ii) at least one of (a) a relationship in which a vehicle-to-object distance between the object and the own vehicle is less than or equal to a set vehicle-to-object distance and (b) a relationship in which the own vehicle is approaching the object at a speed greater than or equal to a set speed, determine that the relative positional relationship is the specific relationship and determine the inhibition threshold value to a smaller value than when the relative positional relationship is not the specific relationship.

(10) The driving supporter according to any one of the above forms (1) through (9), wherein the threshold-value determiner is configured to determine the inhibition threshold value to a smaller value when the relative positional relationship is the specific relationship, and the steering operation in the direction in which the own vehicle avoids the object is performed by the driver, than when the steering operation is not performed by the driver.

It is estimated that the driver feels a not-normal feeling when the driving support is performed in the case where the driver has performed the steering operation in the direction in which the own vehicle avoids the object. To solve this problem, the inhibition threshold value is determined to a small value to make it difficult for the driving support to be executed, making it difficult for the driver to feel the not-normal feeling. A steering-operation-state obtainer obtains information indicating that the driver has performed the steering operation in the direction in which the own vehicle avoids the object. In the above-described embodiment, the steering-operation-state obtainer is constituted by the steering-torque sensor 26, the steering-direction flag Fa, and the steering ECU 12 configured to set the steering-direction flag Fa, for example.

(11) The driving supporter according to any one of the above forms (1) through (10), further comprising:

a supporting device configured to perform the support of the driving; and a support controller configured to control the supporting device to perform the support of the driving.

(12) The driving supporter according to the above form (11), wherein the supporting device comprises an electric power steering device provided between a steering operation member and a wheel and comprising an electric motor, and wherein the support controller is configured to, when there is a possibility of a departure of the own vehicle from the lane, control the electric motor to apply steering torque in a direction in which the departure of the own vehicle from the lane is prevented.

The wheel corresponds to the steered road wheel.

(13) The driving supporter according to the above form (11) or (12), wherein the supporting device does not comprise a notifier that uses body sensation of the driver to indicate that the possibility of the departure of the own vehicle from the lane is high.

(14) The driving supporter according to any one of the above forms (11) through (13), wherein the supporting device comprises a notifier configured to produce a sound to provide a notification about a high possibility of a departure of the own vehicle from the lane, wherein the own vehicle comprises a plurality of seats comprising: one driver's seat and at least one passenger seats different from the one driver's seat, wherein the driving supporter further comprises a plurality of seating detectors respectively provided for the plurality of seats and each configured to detect whether a person is being seated, and wherein the threshold-value determiner comprises a passenger-dependent threshold-value determiner configured to determine the inhibition threshold value to a larger value when seating of the person on the at least one passenger seat is not detected by the plurality of seating detectors, than when seating of the person on at least one of the at least one passenger seat is detected by corresponding at least one of the plurality of seating detectors.

(15) The driving supporter according to the above form (14), wherein the passenger-dependent threshold-value determiner is configured to, when the seating of the person on the at least one passenger seat is not detected by the plurality of seating detectors, determine the inhibition threshold value to a value identical to the inhibition threshold value taken when the relative positional relationship between the object and the own vehicle is not the specific relationship.

(16) A driving supporter configured to perform support of driving such that an own vehicle drives within a lane, the driving supporter comprising:

a support inhibitor configured to inhibit the support of the driving when an absolute value of a steering operation value representing a magnitude of a steering operation performed by a driver is greater than an inhibition threshold value;

wherein the support inhibitor comprises:

a road-surface-unevenness obtainer configured to obtain a degree of unevenness of a road surface on which the own vehicle is running; and a road-surface-unevenness-dependent threshold-value determiner configured to determine the inhibition threshold value to a larger value when the degree of the unevenness of the road surface which is obtained by the road-surfaceunevenness obtainer is large than when the degree of the unevenness of the road surface which is obtained by the road-surface-unevenness obtainer is small.

Examples of the steering operation value in this form include the steering torque applied to the steering mechanism by the driver and the steering force among the above-described examples of the steering operation value, for example. The technical features in the forms (1)-(15) may be incorporated into the driving supporter according to this form.

(17) A driving supporter configured to perform support of driving such that an own vehicle drives within a lane, wherein the driving supporter comprises a support inhibitor configured to inhibit the support of the driving when an absolute value of steering torque produced by an operation of a steering operation member is greater than an inhibition threshold value, wherein the support inhibitor comprises:

an external-disturbance obtainer configured to obtain a magnitude of an external disturbance applied to the own vehicle; and an external-disturbance-dependent threshold-value determiner configured to determine the inhibition threshold value to a larger value when the magnitude of the external disturbance which is obtained by the external-disturbance obtainer is large, than when the magnitude of the external disturbance which is obtained by the external-disturbance obtainer is small. The technical features in the forms (1)-(15) may be incorporated into the driving supporter according to this form. The external disturbance is at least one of unevenness of a road surface, a side wind, and so on, for example.

What is claimed is:

1. A lane keeping system responsive to steering input configured to perform support of driving such that an own vehicle drives within a lane, the lane keeping system comprising:
    a camera configured to obtain object information relating to at least an object in an area;
    a processor programmed to:
        obtain a relative positional relationship between the own vehicle and the object located in the area and identified based on the object information obtained by the camera;
        receive a steering operation value from a steering torque sensor, and inhibit the support of the driving when an absolute value of the steering operation value representing a magnitude of a steering operation performed by a driver is greater than an inhibition threshold value; and
        determine the inhibition threshold value to a smaller value when the relative positional relationship between the object and the own vehicle which is obtained by the processor is a specific relationship in which it is estimated that the driver is to perform a steering operation in a direction in which the own vehicle avoids the object, than when the relative positional relationship between the object and the own vehicle which is obtained by the processor is not the specific relationship,
    wherein the specific relationship occurs when an object-side distance that is a distance between the object and a lane line defining an own lane on which the own vehicle is running is less than or equal to a predetermined object-side distance, and (ii) at least one of (a) a vehicle-to-object distance between the object and the own vehicle is less than or equal to a predetermined vehicle-to-object distance and (b) the own vehicle is approaching the object at a speed greater than or equal to a predetermined speed, and
    the relative positional relationship is not the specific relationship when the object-side distance that is the distance between the object and the lane line defining the own lane on which the own vehicle is running is longer than the predetermined object-side distance, or (ii) (a) the vehicle-to-object distance between the object and the own vehicle is longer than the predetermined vehicle-to-object distance and (b) the own vehicle is approaching the object at a speed smaller than the predetermined speed.

2. The lane keeping system responsive to steering input according to claim 1, wherein the processor is programmed to determine the inhibition threshold value to be a smaller value in response to an estimated time required for the own vehicle to reach an appeared object that is the object obtained first by the processor being shorter.

3. The lane keeping system responsive to steering input according to claim 1, wherein the processor is programmed to:
    obtain a magnitude of an external disturbance acting on the own vehicle, based on the steering operation value from the steering torque sensor; and
    determine the inhibition threshold value to be a larger value in response to the magnitude of the external disturbance which is obtained by the processor being larger.

4. The lane keeping system responsive to steering input according to claim 3,
    wherein the processor is programmed to determine the inhibition threshold value to be a larger value in response to the magnitude of the external disturbance which is obtained by the processor being greater than a predetermined external-disturbance value,
    wherein the processor is programmed to determine the inhibition threshold value to be a smaller value in response to an estimated time required for the own vehicle to reach an appeared object that is the object obtained first by the processor being shorter, and
    wherein the processor is programmed to, when the magnitude of the external disturbance which is obtained by the processor is less than or equal to the predetermined external-disturbance value, determine the inhibition threshold value to be a smaller value in response to the estimated time required for the own vehicle to reach the appeared object being shorter.

5. The lane keeping system responsive to steering input according to claim 3, wherein the processor is programmed to, when the relative positional relationship between the object and the own vehicle which is obtained by the processor is the specific relationship, determine the inhibition threshold value to be a value that is greater in response to the magnitude of the external disturbance being larger and be a value that is less when the relative positional relationship is the specific relationship than when the relative positional relationship is not the specific relationship.

6. The lane keeping system responsive to steering input according to claim 3,
    wherein the processor is programmed to obtain a degree of unevenness of a road surface on which the own vehicle is running based on the steering operation value from the steering torque sensor, and
    wherein the processor is programmed to determine the inhibition threshold value to be a larger value in response to the degree of the unevenness of the road surface which is obtained by the processor being larger.

7. The lane keeping system responsive to steering input according to claim 1, wherein the processor is programmed to determine the inhibition threshold value to a smaller value when the relative positional relationship is the specific relationship, and the steering operation in the direction in which the own vehicle avoids the object is actually performed by the driver, than when the steering operation is not performed by the driver.

8. The lane keeping system responsive to steering input according to claim 1, further comprising:

an electrical power steering device comprising an electric motor, the electrical power steering device being configured to perform the support of the driving;

a steering processor programmed to control the electrical power steering device to perform the support of the driving; and configured to produce a sound to provide a notification about a presence of a possibility of a departure of the own vehicle from the lane, wherein the own vehicle comprises a plurality of seats comprising: one driver's seat and at least one passenger different from the one driver's seat, the lane keeping system further comprises a plurality of seating detectors respectively provided for the plurality of seats and each configured to detect whether a person is seated, and the processor is programmed to determine the inhibition threshold value to a larger value when seating of the person on the at least one passenger seat is not detected by the plurality of seating detectors, than when seating of the person on at least one of the at least one passenger seat is detected by corresponding at least one of the plurality of seating detectors.

* * * * *